United States Patent Office
3,300,502
Patented Jan. 24, 1967

3,300,502
SUBSTITUTED 2-OXO-1,2,3,4-TETRAHYDRO-
QUINOLINES AND THEIR TAUTOMERS
Ernst Seeger, Biberach an der Riss, Germany, assignor to
Boehringer Ingelheim G.m.b.H., Ingelheim (Rhine),
Germany
No Drawing. Filed Apr. 25, 1966, Ser. No. 544,701
Claims priority, application Germany, July 27, 1962,
T 22,518
14 Claims. (Cl. 260—289)

This application is a continuation-in-part of copending application Serial No. 296,371, filed July 19, 1963.

This invention relates to substitution products of 2-oxo-tetrahydroquinolines and their tautomers, as well as to methods of preparing such compounds.

More particularly, the present invention relates to substituted 2-oxo-1,2,3,4-tetrahydroquinolines of the formula

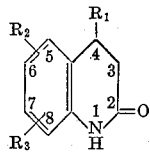

(I)

wherein $R_1$ is hydrogen or alkyl of 1 to 3 carbon atoms, $R_2$ is halogen, and $R_3$ is alkyl of 1 to 3 carbon atoms, which also exist in their tautomeric form of the formula

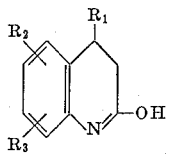

(Ia)

wherein $R_1$, $R_2$ and $R_3$ have the same meanings as in Formula I.

The compounds according to the present invention may be prepared by subjecting a holo-alkanoic acid anilide of the formula

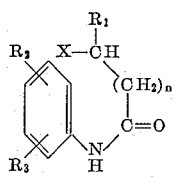

(II)

wherein $R_1$, $R_2$ and $R_3$ have the meanings defined above, X is halogen, and $n$ is an integer from 1 to 2, inclusive, to a cyclization reaction to effect ring closure.

The cyclization reaction is most advantageously effected by heating the halo-alkanoic acid anilide II with aluminum chloride. The temperature may vary over a wide range, but it is preferred to heat the mixture of compound II and aluminum chloride to between 80 and 200° C. The reaction may be performed with or without a solvent or diluent. Suitable diluents or solvents are chlorinated or unchlorinated hydrocarbons, such as dichlorobenzene, ligroin or chloroform.

If the ring closure reaction is effected without a solvent, it is in some cases advantageous to add an alkali metal halide, such as sodium chloride, potassium chloride or mixtures thereof, to the reaction mixture in order to facilitate the formation of a melt and enhance the progress of the ring closure reaction.

Further, I have discovered that the cyclization of γ-chloro-butyric acid anilides as well as β-chloro-butyric acid anilides of the Formula II under the conditions set forth above will yield the same substituted 2-oxo-1,2,3,4-tetrahydroquinoline. In other words, regardless of whether the starting material is a γ-chloro-butyric acid anilide of the formula

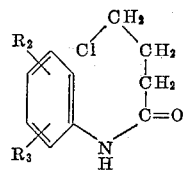

or a β-chloro-butyric acid anilide of the formula

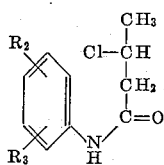

the cyclization product will be a substituted 2-oxo-1,2,3,4-tetrahydroquinoline of the formula

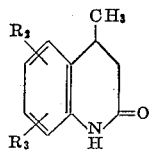

wherein $R_2$ and $R_3$ have the meanings previously defined.

The raw reaction products obtained from the cyclization reaction are mixtures consisting of the desired product and isomers thereof. The desired product may readily be separated from its isomers by treating the raw reaction product with solvents, such as ethanol, ethyl acetate, acetic acid anhydride, glacial acetic acid and the like, or also by chromatographic means, such as by passing a solution of the raw product through an aluminum oxide column.

Another method of preparing the compounds of the present invention consists of halogenating a substituted 2-oxo-1,2,3,4-tetrahydroquinoline of the formula

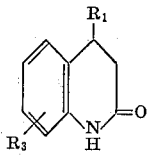

(III)

wherein $R_1$ and $R_3$ have the meanings previously defined under customary halogenating conditions.

The haloalkanoic acid anilides II themselves may be prepared by well known methods, for instance by reacting an anhydride, halide or reactive ester of the desired haloalkanoic acid with a suitably substituted aniline pursuant to the method described by Mayer, van Zütphen and Philipps in Chem Ber. 60, 858 et seq. (1927).

The following examples will further illustrate the present invention and enable other skilled in the art to understand it more completely. It should be understood, however, that the invention is not limited to these particular examples.

EXAMPLE I

*Prepartion of 8-methyl-5-chloro-2-oxo-1,2,3,4-tetrahydroquinoline*

10 gm. of β-chloro-propionic acid-(5-chloro-2-methyl-anilide), M.P. 145–146° C., were intimately admixed with 20 gm. of finely powdered anhydrous aluminum chloride, and the mixture was heated for about 10 minutes on an oil bath at 120–130° C. The reaction had gone to completion when no more evolution of gas could be discerned. At that time the warm molten mixture was poured over a mixture of ice and 20 ml. of aqueous 12% hydrochloric acid. The precipitate formed thereby was separated by vacuum filtration, washed with water until neutral and dried. 8 gm. of a substance having a melting point of 144–145° C. were obtained, which was suspended in a solvent mixture consisting of 9 parts petroleum ether and 1 part ethylacetate. The resulting suspension was introduced into a column filled with neutral aluminum oxide. The column was then eluted with the same solvent mixture, yielding as the first fraction 8-methyl-5-chloro-2-oxo-1,2,3,4-tetrahydroquinoline of the formula

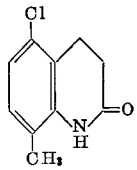

having a melting point of 186° C.

EXAMPLE II

*Preparation of 4,8-dimethyl-6-chloro-2-oxo-1,2,3,4-tetrahydro-quinoline*

An intimate mixture of 20 gm. of β-chloro-butyric acid-(4-chloro-2-methyl-anilide), M.P. 159° C., and 40 gm. of finely powdered aluminum chloride was heated for about 30 minutes at 120° C. on an oil bath. The raw reaction product was introduced into aqueous 10% hydrochloric acid, the precipitate formed thereby was separated by vacuum filtration, washed until neutral, recrystallized several times from ethanol. 5 gm. of a colorless crystalline substance having a melting point of 172–174° C. were obtained, which was identified to be 4,8 - dimethyl - 6 - chloro - 2 - oxo - 1,2,3,4 - tetrahydroquinoline of the formula

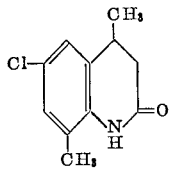

EXAMPLE III

*Preparation of 4,8-dimethyl-7-chloro-2-oxo-1,2,3,4-tetrahydroquinoline*

An intimate mixture of 20 gm. of γ-chloro-butyric acid-(3-chloro-2-methyl-anilide), M.P. 123–125° C., 40 gm. of finely powdered aluminum chloride, 12 gm. of potassium chloride and 12 gm. of sodium chloride was heated for 30 minutes at 100–120° C. on an oil bath. Thereafter, the reaction mixture was worked up as described in Example II. 20 gm. of a substance having a melting point of 152° C. were obtained, which was recrystallized three times from ethanol. 7 gm. of a colorless crystalline substance having a melting point of 157° C. were obtained, which was identified to be 4,8-dimethyl-7-chloro-2-oxo-1,2,3,4-tetrahydroquinoline of the formula

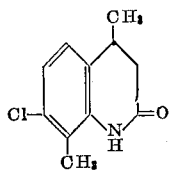

EXAMPLE IV

*Preparation of 8-methyl-6-chloro-2-oxo-1,2,3,4-tetrahydroquinoline*

A mixture of 3 gm. of β-chloro-propionic acid-(4-chloro-2-methyl-anilide), M.P. 135–137° C., and 40 cc. of o,o-dichlorobenzene was heated on an oil bath, accompanied by stirring; at a temperature of about 100° C. the anilide went into solution. At this point 6 gm. of finely powdered aluminum chloride were added, and the mixture was heated for two hours at 150° C. while stirring it. Thereafter, the reaction product was dissolved in water containing some hydrochloric acid and was extracted from this solution with benzene. The benzene solvent was distilled out of the extract solution, and the residue was recrystallized from methanol. A substance having a melting point of 193–195° C. was obtained, which was identified to be 8-methyl-6-chloro-2-oxo-1,2,3,4-tetrahydroquinoline of the formula

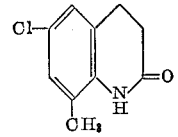

The yield was 35% of theory.

EXAMPLE V

*Preparation of 8-methyl-6-bromo-2-oxo-1,2,3,4-tetrahydroquinoline*

10 gm. of bromine were added dropwise at room temperature to a solution of 5.4 gm. of 8-methyl-2-oxo-1,2,3,4-tetrahydroquinoline, M.P. 110–112° C., in 50 cc. of chloroform, accompanied by stirring. After all of the bromine had been added, the reaction mixture was refluxed for two hours. Thereafter, the chloroform was distilled off, and the residue was recrystallized first from acetone and then from ethanol. 4 gm. of a substance having a melting point of 220–221° C. were obtained, which was analyzed to be 8-methyl-6-bromo-2-oxo-1,2,3,4-tetrahydroquinoline of the formula

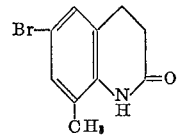

*Analysis.*—Calculated: C, 50.0%; H, 4.16%; N, 5.84%; Br, 33.3%. Found: C, 49.75%; H, 4.28%; N, 5.94%; Br, 33.05%.

The same substance was obtained when the bromination was performed in carbon tetrachloride without refluxing the reaction mixture.

EXAMPLE VI

*Preparation of 6-methyl-5-chloro-2-oxo-1,2,3,4-tetrahydroquinoline and its 7-chloro isomer*

A mixture of 16 gm. of β-chloro-propionic acid-(3-chloro-4-methyl-anilide), M.P. 125–127° C., and 32 gm. of finely powdered aluminum chloride was heated for about 20 minutes at 120° C. Thereafter, the reaction mixture was poured into a mixture of ice and dilute hydrochloric acid, whereby a precipitate formed which was filtered off and washed until neutral.

The raw product thus obtained, which was identified to be a mixture of 6-methyl-5-chloro-2-oxo-1,2,3,4-tetrahydroquinoline and its 7-chloro isomer, was dissolved in 600 cc. of warm acetone. The resulting solution was filtered, and the filtrate was cooled. A colorless crystalline mass precipitated out, which was filtered off, 6 gm. of 6-methyl-5-chloro-2-oxo-1,2,3,4-tetrahydroquinoline of the formula

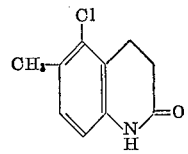

were obtained. It had a melting point of 227–230° C.

*Analysis.*—Calculated: C, 61.5%; H, 5.12%; N, 7.16%; Cl, 18.1%. Found: C, 61.5%; H, 5.27%; N, 7.12%; Cl, 18.0%.

The filtrate was evaporated, and the residue was recrystallized from benzene. 4.5 gm. of a crystalline substance having a melting point of 188–189° C. were obtained. It was identified to be 6-methyl-7-chloro-2-oxo-1,2,3,4-tetrahydroquinoline of the formula

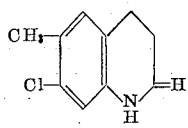

*Analysis.*—Calculated: C, 61.5%; H, 5.12%; N, 7.16%; Cl, 18.1%. Found: C, 61.3%; H, 5.20%; N, 7.20%; Cl, 18.15%.

EXAMPLE VII

*Preparation of 5-ethyl-8-chloro-2-oxo-1,2,3,4-tetrahydroquinoline*

A mixture of 7 gm. of β-chloro-propionic acid-(6-chloro-3-ethyl-anilide), M.P. 115–117° C. and 14 gm. of finely powdered aluminum chloride was heated for 30 minutes at 120° C. on an oil bath. The resulting molten mass was poured into water containing some hydrochloric acid, whereby an oily precipitate was formed. The precipitate was extracted with ether, the extract solution was dried over sodium sulfate, and the ether was distilled off. The oily residue was distilled in vacuo, leaving a colorless, viscous oil having a boiling point of 122–123° C. at 0.05 mm. Hg. It was identified to be 5-ethyl-8-chloro-2-oxo-1,2,3,4-tetrahydroquinoline of the formula

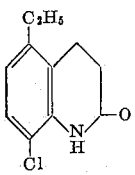

EXAMPLE VIII

*Preparation of 8-methyl-7-chloro-2oxo-1,2,3,4-tetrahydroquinoline*

A mixture of 100 gm. of β-chloro-propionic acid-(3-chloro-2-methyl-anilide), M.P. 125–127° C., and 200 gm. of powdered aluminum chloride was heated for 30 minutes at 130° C. on an oil bath. The molten mass obtained thereby was then introduced into water containing some hydrochloric acid. The precipitate formed thereby was separated by vacuum filtration and washed with water until neutral. 79 gm. of raw reaction product were obtained, which corresponds to a yield of 95% of theory. The raw product was recrystallized twice from ethanol in the presence of animal charcoal, yielding 20 gm. of a substance having a melting point of 177–178° C., which was identified to be 8-methyl-7-chloro-2-oxo-1,2,3,4-tetrahydroquinoline of the formula

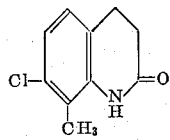

The compounds according to the present invention have useful pharmacodynamic properties. More particularly they exhibit sedative, antipyretic and analgesic properties in warm blooded animals.

For pharmacological purposes the compounds of the present invention are conveniently administered perorally, rectally or parenterally to warm blooded animals as active ingredients in customary dosage unit compositions, that is, compositions consisting essentially of an inert, physiologically compatible carrier and one dosage unit of the active ingredient. One dosage unit of the compounds of the present invention is 50–500 mgm., preferably 200–400 mgm. The dosage unit compositions comprising the compounds of the present invention as active ingredients may also contain additional analgesic and antipyretic ingredients, such as aspirin, 4-dimethylamino-2,3-dimethyl-1-phenyl-3-pyrazolin-5-one, 2,3-dimethyl-1-phenyl-3-pyrazolin-5-one and p-ethoxyacetanilide.

The following examples illustrate dosage unit compositions containing a compound of the present invention as an active ingredient. The parts are parts by weight unless otherwise specified.

EXAMPLE IX

*Tablets.*—The tablets are compounded from the following ingredients:

| | Parts |
|---|---|
| 8-methyl-6-chloro-2-oxo-1,2,3,4-tetrahydroquinoline | 300.0 |
| Potato starch | 66.0 |
| Gelatin | 10.0 |
| Magnesium stearate | 4.0 |
| Total | 380.0 |

*Compounding procedure.*—The tetrahydroquinoline compound is admixed with the potato starch, and the mixture is granulated by moistening it with a 12% solution of the gelatin in distilled water and passing the moist mixture through a 1.5-mm.-mesh screen. The moist granulate is then dried at 45° C. The dry granulate is again passed through the 1.5 mm.-mesh screen and is then admixed with the magnesium stearate which had been passed through a 0.75 mm.-mesh screen. The resulting mixture was pressed into 380 mgm. tablets. Each tablet contains 300 mgm. of the active ingredient.

EXAMPLE X

*Coated pills.*—The pill cores are compounded from the following ingredients:

| | Parts |
|---|---|
| 8-methyl-6-chloro-2-oxo-1,2,3,4-tetrahydroquinoline | 200.0 |
| Corn starch | 70.0 |
| Polyvinylpyrrolidone | 7.0 |
| Magnesium stearate | 3.0 |
| Total | 280.0 |

*Compounding procedure.*—The tetrahydroquinoline compound is admixed with the corn starch, and the mixture is granulated by moistening it with a 10% solution of the polyvinylpyrrolidone in distilled water and passing the moist mixture through a 1.5 mm.-mesh screen. The moist granulate is dried at 45° C., and the dry granulate is again passed through the 1.5 mm.-mesh screen. The granulate is then admixed with the magnesium stearate which had been passed through a 0.75 mm.-mesh screen, and the mixture was pressed into 280 mgm. pill cores. Each pill core contains 200 mgm. of the active ingredient. The pill cores thus obtained are then coated with a thin shell consisting essentially of sugar and talcum, and the coated pills are polished with beeswax. Each pill weighs approximately 400 mgm.

EXAMPLE XI

*Wafer capsules.*—The contents of the capsules are compounded from the following ingredients:

| | Parts |
|---|---|
| 8-methyl-6-chloro-2-oxo-1,2,3,4-tetrahydroquinoline | 250.0 |
| Colloidal silicic acid | 25.0 |
| Total | 275.0 |

*Compounding procedure.*—The tetrahydroquinoline compound and the silicic acid are thoroughly admixed with each other, and the mixture is passed through a 0.75 mm.-mesh screen. The screened mixture is filled into wafer capsules holding 275 mgm. of the mixture. Each capsule contains 250 mgm. of the active ingredient.

EXAMPLE XII

*Suppositories.*—The suppository composition is compounded from the following ingredients:

| | Parts |
|---|---|
| 8-methyl-6-chloro-2-oxo-1,2,3,4-tetrahydroquinoline | 400.0 |
| Suppository base (cocoa butter) | 1300.0 |
| Paraffin oil | 100.0 |
| Total | 1800.0 |

*Compounding procedure.*—The suppository base and the paraffin oil are admixed, the mixture is melted and is then cooled to 37° C. The tetrahydroquinoline compound in finely powdered form is incorporated into the melt with the aid of a high-speed stirring device. The homogenized mass is poured into cooled suppository molds, each holding 1800 mgm. of the composition. Each suppository contains 400 mgm. of the active ingredient.

EXAMPLE XIII

*Tablets.*—The tablets are compounded from the following ingredients:

| | Parts |
|---|---|
| 8-methyl-7-chloro-2-oxo-1,2,3,4-tetrahydroquinoline | 200.0 |
| 4-dimethylamino-2,3-dimethyl-1-phenyl-3-pyrazolin-5-one | 200.0 |
| Lactose | 100.0 |
| Corn starch | 80.0 |
| Polyvinylpyrrolidone | 15.0 |
| Magnesium stearate | 5.0 |
| Total | 600.0 |

*Compounding procedure.*—The tetrahydroquinoline compound, the pyrazolone compound, the lactose and the corn starch are admixed with each other, and the mixture is granulated by moistening it with a 10% solution of the polyvinylpyrrolidone in distilled water, passing the moist mixture through a 1.5 mm.-mesh screen and drying the moist granulate at 45° C. The dry granulate is again passed through the 1.5 mm.-mesh screen, then thoroughly admixed with the magnesium stearate which had been passed through a 0.75 mm.-mesh screen, and the mixture is pressed into 600 mgm. tablets. Each tablet contains 200 mgm. of the tetrahydroquinoline compound and 200 mgm. of the pyrazolone compound as active ingredients.

EXAMPLE XIV

*Tablets.*—The tablets are compounded from the following ingredients:

| | Parts |
|---|---|
| 4,8-dimethyl-7-chloro-2-oxo-1,2,3,4-tetrahydroquinoline | 250.0 |
| Aspirin | 250.0 |
| Lactose | 40.0 |
| Potato starch | 40.0 |
| Aluminum stearate | 20.0 |
| Total | 600.0 |

*Compounding procedure.*—The individual ingredients are thoroughly admixed with each other, and the mixture is pressed into briquettes, which are dry-granulated in a suitable screening machine with a 1.5 mm.-mesh screen. The granulate thus obtained is pressed into 600 mgm. tablets, each containing 250 mgm. of the tetrahydroquinoline compound and 250 mgm. of aspirin as active ingredients.

EXAMPLE XV

*Coated pills.*—The pill cores are compounded from the following ingredients:

| | Parts |
|---|---|
| 4,8-dimethyl-6-chloro-2-oxo-1,2,3,4-tetrahydroquinoline | 300.0 |
| p-Ethoxy-acetanilide | 200.0 |
| Corn starch | 86.0 |
| Gelatin | 12.0 |
| Magnesium stearate | 2.0 |
| Total | 600.0 |

*Compounding procedure.*—The tetrahydroquinoline compound, the p-ethoxy-acetanilide and the corn starch are admixed with each other, and the resulting mixture is granulated by moistening it with a 10% solution of the gelatin in distilled water, passing the moist mixture through a 1.5 mm.-mesh screen and drying the moist granulate at 45° C. The dry granulate is admixed with the magnesium stearate (0.75 mm.-mesh size), and the mixture is pressed into 600 mgm. pill cores, each containing 300 mgm. of the tetrahydroquinoline compound and 200 mgm. of p-ethoxy-acetanilide as active ingredients. The pill cores are then coated with a thin shell consisting essentially of talcum and sugar, and are then polished with beeswax. Each pill weighs approximately 800 mgm.

EXAMPLE XVI

*Tablets.*—The tablets are compounded from the following ingredients:

| | Parts |
|---|---|
| 8-methyl-5-chloro-2-oxo-1,2,3,4-tetrahydroquinoline | 300.0 |
| 2,3,-dimethyl-1-phenyl-3-pyrazolin-5-one | 300.0 |
| Corn starch | 85.0 |
| Gelatin | 10.0 |
| Magnesium stearate | 5.0 |
| Total | 700.0 |

*Compounding procedure.*—The tetrahydroquinoline compound, the pyrazolone compound and the corn starch are admixed with each other, and the resulting mixture is granulated by moistening it with a 6% solution of the gelatin in water, passing the moist mixture through a 2.0 mm.-mesh screen and drying the moist granulate at 45° C. The dry granulate is again passed through the 2.0 mm.-mesh screen, admixed with the magnesium stearate, and the mixture is pressed into 700 mgm. tablets. Each tablet contains 300 mgm. of the tetrahydroquinoline compound and 300 mgm. of the pyrazolone compound as active ingredients.

Although the above illustrative dosage unit compositions contain only a limited number of species of the group of compounds according to the present invention as active ingredients, it is obvious that any other 2-oxo-1,2,3,4-tetrahydroquinoline substitution product embraced by Formula I above may be substituted therefor. Similarly, the dosage of the active ingredient may be varied in the illustrative examples within the indicated limits to meet specific needs and requirements.

While the present invention has been illustrated with the aid of certain specific embodiments, it will be readily apparent to others skilled in the art that the invention is not limited to these embodiments and that various changes and modifications may be made without departing from the spirit of the invention or the scope of the appended claims.

What is claimed is:

1. A compound selected from the group consisting of substituted 2-oxo-1,2,3,4-tetrahydroquinolines of the formula

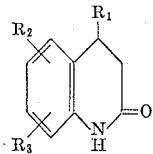

and their tautomers of the formula

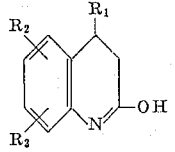

wherein
  $R_1$ is selected from the group consisting of hydrogen and alkyl of 1 to 3 carbon atoms,
  $R_2$ is halogen, and
  $R_3$ is alkyl of 1 to 3 carbon atoms.

2. A compound according to claim 1, wherein
  $R_1$ is selected from the group consisting of hydrogen and methyl,
  $R_2$ is a halogen selected from the group consisting of chlorine and bromine, and
  $R_3$ is selected from the group consisting of methyl and ethyl.

3. A compound according to claim 2, wherein $R_1$ is methyl, $R_2$ is 7-chloro and $R_3$ is 8-methyl.

4. A compound according to claim 2, wherein $R_1$ is methyl, $R_2$ is 6-chloro and $R_3$ is 8-methyl.

5. A compound consisting of substituted 2-oxo-1,2,3,4-tetrahydroquinolines of the formula

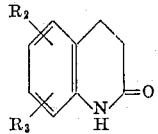

wherein
  $R_2$ is halogen, and
  $R_3$ is alkyl of 1 to 3 carbon atoms.

6. A compound according to claim 5, wherein $R_2$ is 6-chloro and $R_3$ is 8-methyl.

7. A compound according to claim 5, wherein $R_2$ is 7-chloro and $R_3$ is 8-methyl.

8. A compound according to claim 5, wherein $R_2$ is 5-chloro and $R_3$ is 8-methyl.

9. The process of preparing a compound selected from the group consisting of substituted 2-oxo-1,2,3,4-tetrahydroquinolines of the formula

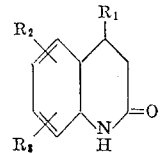

and their tautomers of the formula

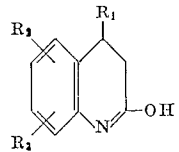

wherein
  $R_1$ is selected from the group consisting of hydrogen and alkyl of 1 to 3 carbon atoms,
  $R_2$ is halogen, and
  $R_3$ is alkyl of 1 to 3 carbon atoms,
which comprises heating a halo-alkanoic acid anilide of the formula

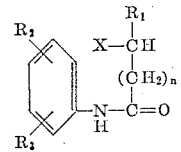

wherein $R_1$, $R_2$ and $R_3$ have the meanings defined above, X is a halogen and $n$ is an integer from 1 to 2, inclusive, to a temperature between 80 and 200° C., inclusive, in the presence of a Lewis acid and recovering the reaction product.

10. The process according to claim 9, wherein the Lewis acid is aluminum chloride.

11. The process according to claim 9, wherein the halo-alkanoic acid anilide and the Lewis acid are heated in the presence of an inert organic solvent.

12. The process according to claim 11, wherein the inert organic solvent is a liquid hydrocarbon.

13. The process according to claim 11, wherein the inert organic solvent is a liquid chlorinated hydrocarbon.

14. The process according to claim 9, wherein the inert organic solvent is ligroin.

No references cited.

ALEX MAZEL, *Primary Examiner.*

DONALD G. DAUS, *Assistant Examiner.*

UNITED STATES PATENT OFFICE
CERTIFICATE OF CORRECTION

Patent No. 3,300,502 January 24, 1967

Ernst Seeger

It is hereby certified that error appears in the above numbered patent requiring correction and that the said Letters Patent should read as corrected below.

Column 1, line 40, for "holo-" read -- halo---; column 5, line 36, the formula should appear as shown below instead of as in the patent:

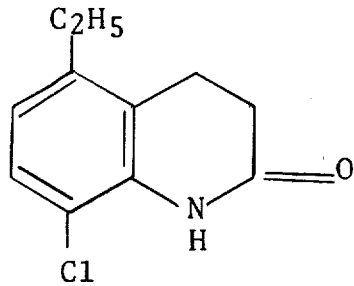

Signed and sealed this 17th day of October 1967.

(SEAL)
Attest:

EDWARD M. FLETCHER, JR.
Attesting Officer

EDWARD J. BRENNER
Commissioner of Patents